Jan. 17, 1939.    A. H. HABERSTUMP    2,143,943
METHOD OF SUPPORTING TRIM MATERIAL IN VEHICLE BODIES
Filed Aug. 30, 1935    2 Sheets-Sheet 1
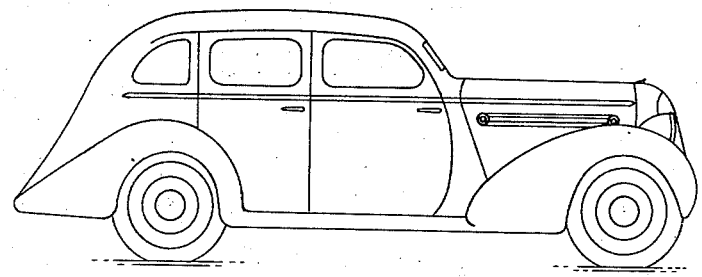
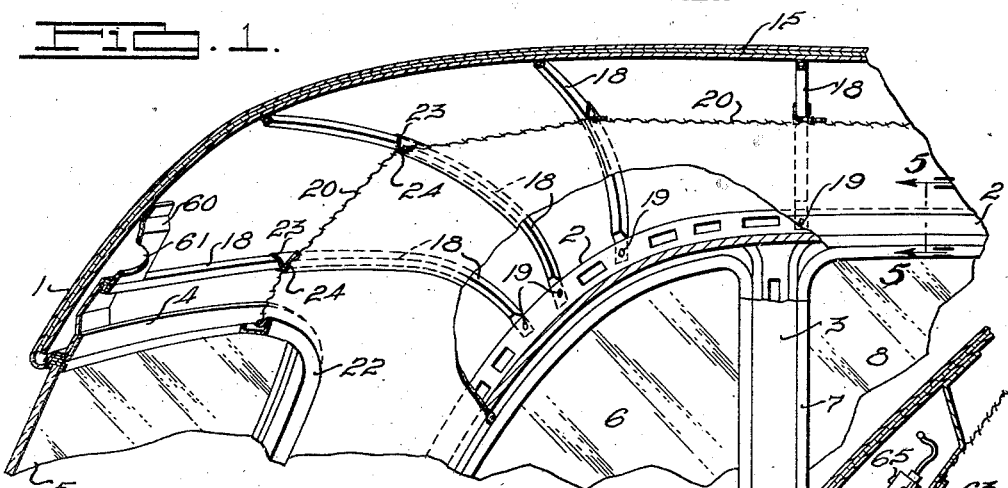
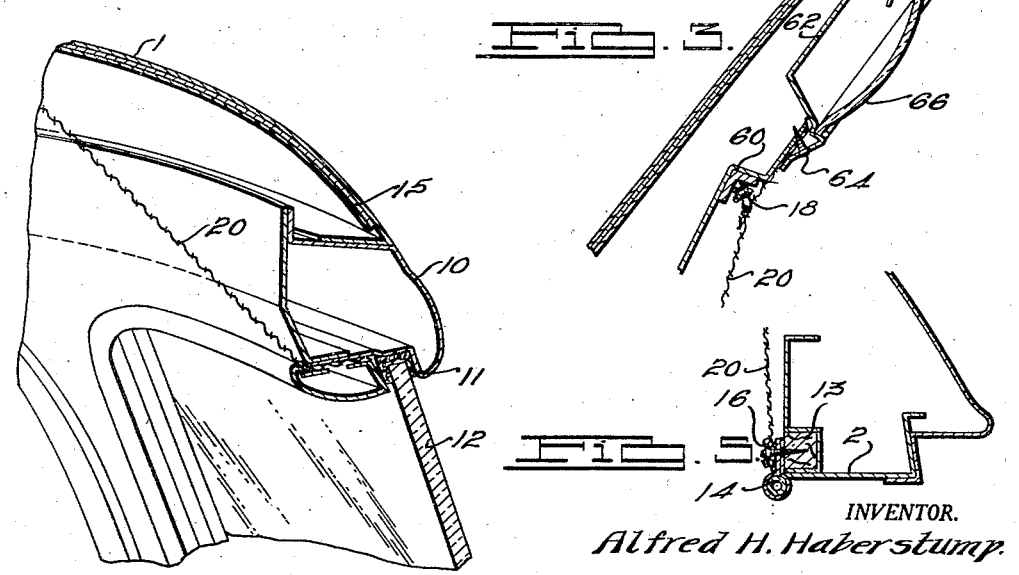
INVENTOR.
Alfred H. Haberstump.
BY
Harness, Dickey, Pierce & Hann.
ATTORNEYS.

Jan. 17, 1939.  A. H. HABERSTUMP  2,143,943
METHOD OF SUPPORTING TRIM MATERIAL IN VEHICLE BODIES
Filed Aug. 30, 1935   2 Sheets-Sheet 2
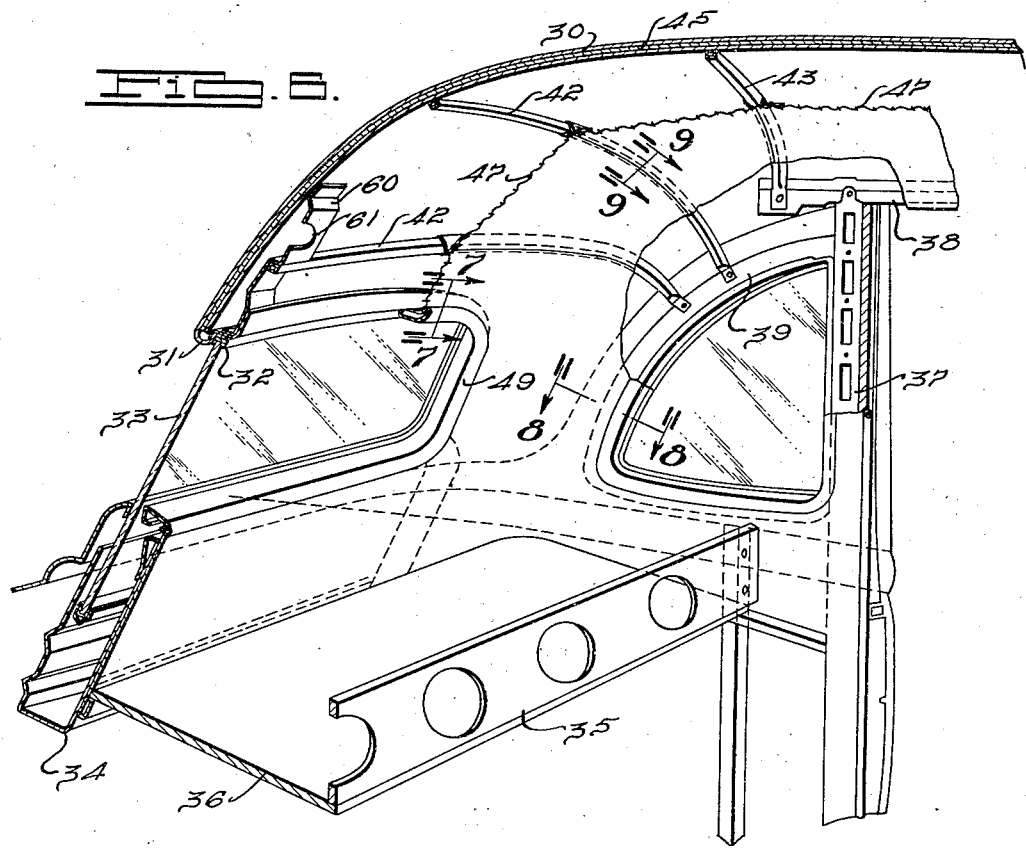
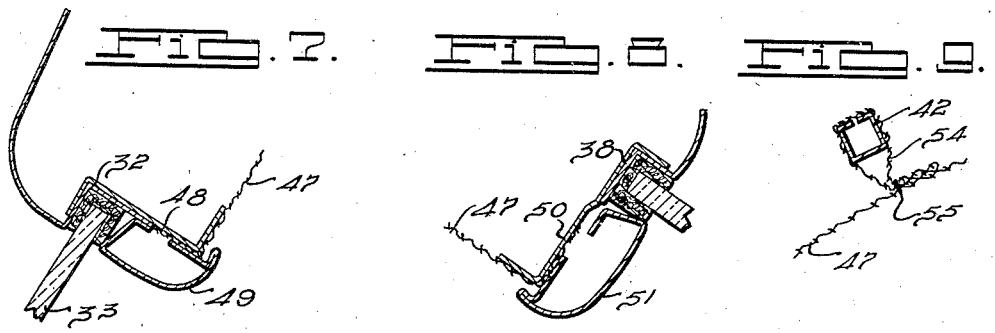
INVENTOR.
Alfred H. Haberstump.
BY
Harness, Dickey, Pierce & Hann.
ATTORNEYS.

Patented Jan. 17, 1939

2,143,943

UNITED STATES PATENT OFFICE 2,143,943

METHOD OF SUPPORTING TRIM MATERIAL IN VEHICLE BODIES

Alfred H. Haberstump, Detroit, Mich., assignor to The Murray Corporation of America, a corporation of Delaware Application August 30, 1935, Serial No. 38,590

5 Claims. (Cl. 296—137)

This invention relates generally to top constructions for automobiles. More particularly, it relates to that particular portion of automobile top construction which has to do with the mounting of the inner trim material internally of a permanent top.

It is a general object of the present invention to provide simple and novel means for supporting the inner trim material internally of an automobile top, in order that the material supported will give a smooth, rounded appearance and render the interior aspect of the top particularly attractive.

Still another object of the invention contemplates the provision of a plurality of pivotally mounted bows, disposed between the roof panel of the top and the trim material, these bows serving to support the trim material, and also serving to support soundproofing material internally of the roof panel of the automobile.

Yet another object of the invention consists of novel means for securing the marginal edges of the top material adjacent the various window and door openings of the body in which the inner trim material is mounted.

Still another object of the invention consists in the provision of a construction for installing inner trim material, in which the inner trim material may be relatively simply and permanently installed.

Still another object of the invention consists in the provision of means for mounting of the inner trim material so that it will be substantially and uniformly spaced from the roof panel of the automobile and yet firmly and permanently mounted in position.

Still another object of the invention consists in the provision of means for supporting inner trim material within the body of an automobile in such a manner that it will be substantially uniformly stretched throughout its entire area, thus producing a smooth, rounded, attractive interior finish.

Still further, the present invention contemplates novel means for securing soundproofing material adjacent the interior surface of the roof panel of the automobile.

Many other advantages and objects of the invention described herein will be apparent to those skilled in the art after a consideration of the following specification when taken in connection with the accompanying drawings, forming a part thereof.

In the drawings,

Fig. 1 illustrates a side elevation of the type of automobile to which the present invention is particularly adapted.

Fig. 2 is a view of the rear portion of the automobile partly in section, and having portions broken away to illustrate the novel mounting of the interior trim material therein.

Fig. 3 is an enlarged detailed sectional view showing the means by which a dome light is mounted in the rear portion of the interior of the car.

Fig. 4 is a sectional view taken through the front portion of the automobile body, showing the manner in which the forward end of the trim material is secured to the windshield header.

Fig. 5 is a sectional view taken on the line 5—5 of Fig. 2, showing the manner in which the trim material may be secured adjacent a door opening.

Fig. 6 is a view of the rear portion of a coupé body, partially in section and having portions broken away and showing the mounting of the trim material and soundproofing material within the top.

Fig. 7 is an enlarged sectional view taken on the line 7—7 of Fig. 6 showing the manner in which the interior trim material is secured to the body adjacent the rear window.

Fig. 8 is an enlarged sectional view taken on the line 8—8 of Fig. 6 showing the manner in which the interior trim material is secured adjacent one of the rear side windows of the body.

Fig. 9 is an enlarged sectional view taken on the line 9—9 of Fig. 6, showing in detail the manner in which the interior trim material is mounted on one of the bows.

As will be clearly seen hereinafter, the invention described herein is particularly adaptable to that type of automobile shown in Fig. 1, in which the top portion is in general streamlined. The front portion of the automobile shown in Fig. 1 it will be noted, is smoothly sloped upwardly and rearwardly and forms a smooth, even curve from front to rear. It is in this particular type of construction that the invention described herein is particularly adaptable, as it is necessary that the inner trim material follow a similar smooth even curve of similar form.

With more particular reference to the drawings, in Fig. 2 is seen a sectional view through the rear top portion of an automobile body embodying the invention.

The body herein shown is of all steel construction and comprises a single unitary roof panel 1, which at its side edges is joined to a side rail member 2, supported by a rear door post 3, as is conventional in the art. Carried by the rear portion of the top panel 1, is a frame 4 adapted to receive a rear window 5. Also, as is conventional, the body is provided with a rear side window 6 and a door 7 carrying the customary slidably mounted window 8. The mounting of these windows and doors with respect to the body of the automobile is substantially conventional, and forms no part of the present invention.

In Fig. 4, is seen the forward end of the body, the rear portion of which has just been described in connection with Fig. 2. It will be seen that the forward portion of the roof panel is secured to a windshield header 10 which serves to provide a mounting for the windshield frame 11 in which is carried the customary windshield 12. Mounted internally of the roof panel 1, are sections of soundproofing material 15. This soundproofing may be of any desired material, but is herein shown to comprise sections of ply wood. This material is in general bent to conform with the contour of the inner surface of the roof panel 1, and adapted to lie closely adjacent thereto.

A plurality of bows 18 are pivotally mounted at their ends, as at 19, along the side rail 2 of the frame of the body. These bows may be spaced at suitable intervals from the front to rear of the automobile and have an exterior curvature substantially complemental to the interior curvature of the roof panel 1. It is noted that as these bows 18 are swung about their pivot points 19, the arc of such swinging movement brings them into close frictional engagement with the interior surface of the roof panel 1. It will be seen when the soundproofing material 15 is inserted interiorly of the roof panel 1, and these bows 18 are swung about their pivots 19, they will come into frictional engagement with the interior surface of the soundproofing material 15 and force this soundproofing material into fixed engagement with the interior of the roof panel 1. It will be seen that this frictional engagement serves to hold the bow members 18 rigidly in place with respect to the top.

As many of the bow members 18 may be used as is desired and they are generally of a length and conformation such that when they are substantially vertically disposed with respect to the side rail member 2 on which they are mounted, they will closely, frictionally engage the soundproofing material on the interior surface of the roof panel of the top.

In order to provide a smooth and attractive finish for the top construction, fabric interior trim material 20 is provided to cover the entire interior surface of the top. The marginal edges of this material adjacent the window openings in the body of the car, are preferably secured directly to the framework of the car by an adhesive material such as glue or shellac, which sticks the surface of the cloth directly and firmly to the metal flange of the body surrounding the particular window or other opening. Details of this construction are seen in Figs. 2, 4, 6, 7 and 8. In each instance where the marginal edge of the interior trim material is secured adhesively to the framework of the car, the joint at this point is covered by a suitable garnish molding. Such a molding 22 is seen in Fig. 2 surrounding the rear window opening in the rear portion of the car.

As is seen in Figure 5, adjacent the door openings of the car, it is customary to provide the marginal edges of the body with a tacking strip 13 to which it is customary to secure a finish bead 14 which projects outwardly into the door opening to insure a tight closure of the door with respect to the body. Throughout this area the marginal edges of the inner trim material may be secured to this tacking strip 13 by means of tacks 16.

Listing 23 is provided for supporting the inner trim material, generally tubular in form, and is slipped over the bows and has its edges sewed together and sewed to the interior trim material of the top at suitable intervals. The manner in which the listing is secured to the inner trim material may be seen in Fig. 2. It will be seen that the listing comprises a narrow strip of fabric material which surrounds the bow 18 and has its edges sewed together and secured to the inner trim material by means of a line of stitching 24.

In Fig. 6 is seen the rear portion of a coupé body, in which the mounting of the inner trim material and soundproofing within the body is substantially the same as has been described in connection with Fig. 2. In Fig. 6 it will be seen that the roof panel 30 slopes rearwardly and forms a window opening 31 for the rear window of the coupé body. Similar to the construction described above, a rear window 33 is surrounded by a frame 32, and is vertically adjustable with respect to the frame. The window is provided with a suitable well 34 into which the window may descend when it is desired to lower it. In this type of body, a transverse brace member 35 is provided to support the rear portion of the seat of the automobile and this, together with the rear body panel and flooring 36, forms a package compartment. It will be further noted that in this form of body, the door post 37 serves to support a side rail member 38 which is independent of a side rail member 39 serving to define the rear side window openings. In this type of body, a pair of bows 42 are shown pivotally mounted on the side rail member 29, and additional bows such as indicated by the bow 43 may be pivotally mounted upon the side rail member 38. These bows perform the same function as did the bows 18 shown in Fig. 2, and serve to retain soundproofing material 45 closely against the roof panel of the car.

Inner trim material 47 is adhesively secured to the metallic flanges surrounding the various window openings, as is shown in detail in Figs. 7 and 8. Fig. 7 shows in detail the manner in which this inner trim material 47 is secured to the window frame 32. The trim material is glued to the metallic flange of the frame 32 throughout an area generally designated by the reference character 48, and this area of adhesive securement is covered by a garnish molding 49 surrounding the rear window 33. Similarly, the inner trim material 49 is secured to the flange on the side rail member 38 throughout an area generally designated by the character 50 and is covered by a garnish molding 51 secured to the side rail member 38.

Intermediate its marginal edges, the inner trim material is supported by means of the bows 42. A detail of the manner in which the inner trim material 47 is connected to the bows is shown in Fig. 9. It will be seen that the bow member 42 is surrounded by listing 43, which is secured together at its edges and secured to inner trim material 47 by means of stitching 54. It will be appreciated that this general manner of supporting the interior trim material gives a rather resilient support to this material intermediate its marginal edges, and serves to provide the inner surface thereof with a smooth rounded curvature, corresponding to the general curvature of the roof panel of the body.

Means are provided in the rear portion of the top above the rear window therein for mounting a dome light. The means provided are identical in the case of the coupé body illustrated in Fig. 6, as well as in the case of the style of body illustrated in Fig. 2. In both instances, a bracket 60 is secured, preferably by welding, to the frame of the rear window of the car. This bracket has an aperture 61 therein adapted to receive the reflector of a dome light. The surface of the bracket surrounding this aperture is relatively flat and provides a surface to which the adjacent marginal edges of the interior trim material may be adhesively secured in substantially the same manner as this material was secured to the flat flanges surrounding the window openings as described above. After this bracket has been secured in place and the inner trim material has been glued to the flat surface surrounding the aperture 61, a reflector 62 is seated in the aperture 61. The reflector 62 preferably has formed integrally therewith an annular flange surrounding the opening of the reflector and adapted to provide a finish molding for the surface of the flange bracket 60 surrounding the aperture 61. This flange 63 is preferably secured to the bracket 60 by means of suitable screws 64 and serves to cover the area of adhesive securement of the inner trim. The reflector 62 is provided with a light socket 65 which may carry a bulb (not shown) for the purpose of providing illumination in the reflector. The reflector as a whole may be closed by means of a removable, translucent lens 66, secured therein by means of an expansible ring 67.

In installing the trim material in the improved top construction, the fabric forming the inner trim is preferably cut substantially to its final form. It is then secured by means of glue to the flanges surrounding the rear window and to the flanges surrounding the rear side windows of the car. The listing has preferably been secured to the body of the material prior to the mounting of any of the inner trim material within the top. The bows are then inserted in the tubular portion of the listing and pivotally mounted to the side rail members of the body. The assembly operation generally progressing forwardly, and as each bow is pivotally mounted in place, it is pulled forwardly sufficient to stretch the inner trim material to the desired extent and at the same time wedge against the soundproofing material at the top part of the car, thus holding the soundproofing material rigidly in engagement with the roof portion of the car, and at the same time serving to seat the bow permanently in place. This operation proceeds until the last bow at the forward end of the top is permanently seated in place. It will be seen, therefore, that the material at the rear portion of the car is completely stretched to give the desired finish. The forward edge of the material is then secured underneath the windshield header and covered with the garnish molding surrounding the windshield flange.

It will be seen that the invention herein described provides a simple and satisfactory means for mounting the interior trim material within the automobile. Further, it will be apparent that the bows serving to mount this inner trim material serve also the purpose of retaining the soundproofing material in tight engagement with the top panel of the car and also that this wedging action of the soundproofing material between the roof panel of the car and the bows serves to retain the bows in a permanent position.

The structural features described herein produce a combination of elements which serves to provide a relatively simple method of assembling the inner trim material.

It will be apparent to those skilled in the art that many and various modifications of the invention described herein may be made without departing from the generic spirit thereof, as defined in the following claims.

What is claimed is:

1. In an automobile, inner trim material to provide an interior covering for the roof of the automobile, said inner trim material being secured to the frame in its marginal edges, and supported intermediate its edges by means of a plurality of bows pivotally mounted on the frame of said body.

2. In an automobile body, inner trim therein, a plurality of pivotally mounted bows mounted on said body frame, means for securing said inner trim to said bows, said bows being adapted for frictional engagement with the inner surface of the top of said automobile.

3. In an automobile body, a plurality of bows pivotally mounted on said body interiorly of the top thereof, said bows adapted for frictional engagement with the interior surface of said top, trim material mounted interiorly of said body, the marginal edges of said material being secured to the frame of said body and listing interconnecting said material and said bows.

4. In an automobile body construction, a roof panel, soundproofing material disposed interiorly of said roof panel, inner trim material disposed interiorly of said soundproofing material, a plurality of bows pivotally mounted on said body adapted to engage frictionally the inner surface of said soundproofing material to retain it in fixed relation to the top and means carried by said bows for supporting said inner trim material.

5. In an automobile body construction, a roof panel arched from side to side of the vehicle, roof rails secured to the lateral side edges of said roof panel, a series of bows longitudinally spaced and having their ends pivotally secured to said roof rails whereby they may be swung into frictional engagement with said roof panel, and trim material supported on said bows whereby pivotal movement of said bows serves to tension said trim material.

ALFRED H. HABERSTUMP.